(12) United States Patent
Pfaff et al.

(10) Patent No.: US 6,779,340 B2
(45) Date of Patent: Aug. 24, 2004

(54) METHOD OF SHARING FLOW OF FLUID AMONG MULTIPLE HYDRAULIC FUNCTIONS IN A VELOCITY BASED CONTROL SYSTEM

(75) Inventors: Joseph L. Pfaff, Wauwatosa, WI (US); Keith A. Tabor, Richfield, WI (US)

(73) Assignee: HUSCO International, Inc., Waukesha, WI (US)

( * ) Notice: Subject to any disclaimer, the term of this patent is extended or adjusted under 35 U.S.C. 154(b) by 64 days.

(21) Appl. No.: 10/254,466

(22) Filed: Sep. 25, 2002

(65) Prior Publication Data

US 2004/0055289 A1 Mar. 25, 2004

(51) Int. Cl.[7] ............................................. F16D 3/02
(52) U.S. Cl. ..................................... 60/422; 91/435
(58) Field of Search ........................... 60/422; 91/435

(56) References Cited

U.S. PATENT DOCUMENTS

| | | |
|---|---|---|
| 3,954,046 A | 5/1976 | Stillhard |
| 4,061,155 A | 12/1977 | Sopha |
| 4,250,794 A | 2/1981 | Haak et al. |
| 4,437,385 A | 3/1984 | Kramer et al. |
| 4,712,376 A | 12/1987 | Hadank et al. |
| 5,176,504 A | 1/1993 | Moriya et al. |
| 5,201,177 A | 4/1993 | Kim |
| 5,249,140 A | 9/1993 | Kessler |
| 5,490,384 A | 2/1996 | Lunzman |
| 5,666,806 A | 9/1997 | Dietz |
| 5,701,793 A | 12/1997 | Gardner et al. |
| 5,878,647 A | 3/1999 | Wilke et al. |
| 5,947,140 A | 9/1999 | Aardema et al. |
| 5,960,695 A | 10/1999 | Aardema et al. |
| 6,282,891 B1 | 9/2001 | Rockwood |
| 6,498,973 B2 | 12/2002 | Dix et al. |

OTHER PUBLICATIONS

Arne Jansson, et al., "Separate Controls of Meter–in and Meter–out Orifices in Mobile Hyraulic Systems," SAE Technical Papers Series, Sep. 1999, pp. 1–7, SAE International, Warrendale, PA.

Primary Examiner—Edward K. Look
Assistant Examiner—Michael Leslie
(74) Attorney, Agent, or Firm—George E. Haas; Quarles & Brady LLP

(57) ABSTRACT

A plurality of hydraulic actuators are connected between a supply line and a tank return line. A separate desired velocity is requested for each hydraulic actuator. In response to a respective metering mode and the desired velocity for each hydraulic actuator, the flow requirements that each hydraulic actuator has from the supply and return lines are derived. A determination is made as to what fractions of the required flows can be provided by the flow levels that are available from the supply and return lines. Those fractions are used to convert the desired velocity for the given hydraulic actuator into a velocity command which indicates the velocity of the given hydraulic actuator that can be achieved with the available fluid flows. The respective velocity command is used to control the flow of fluid to each hydraulic actuator.

20 Claims, 2 Drawing Sheets

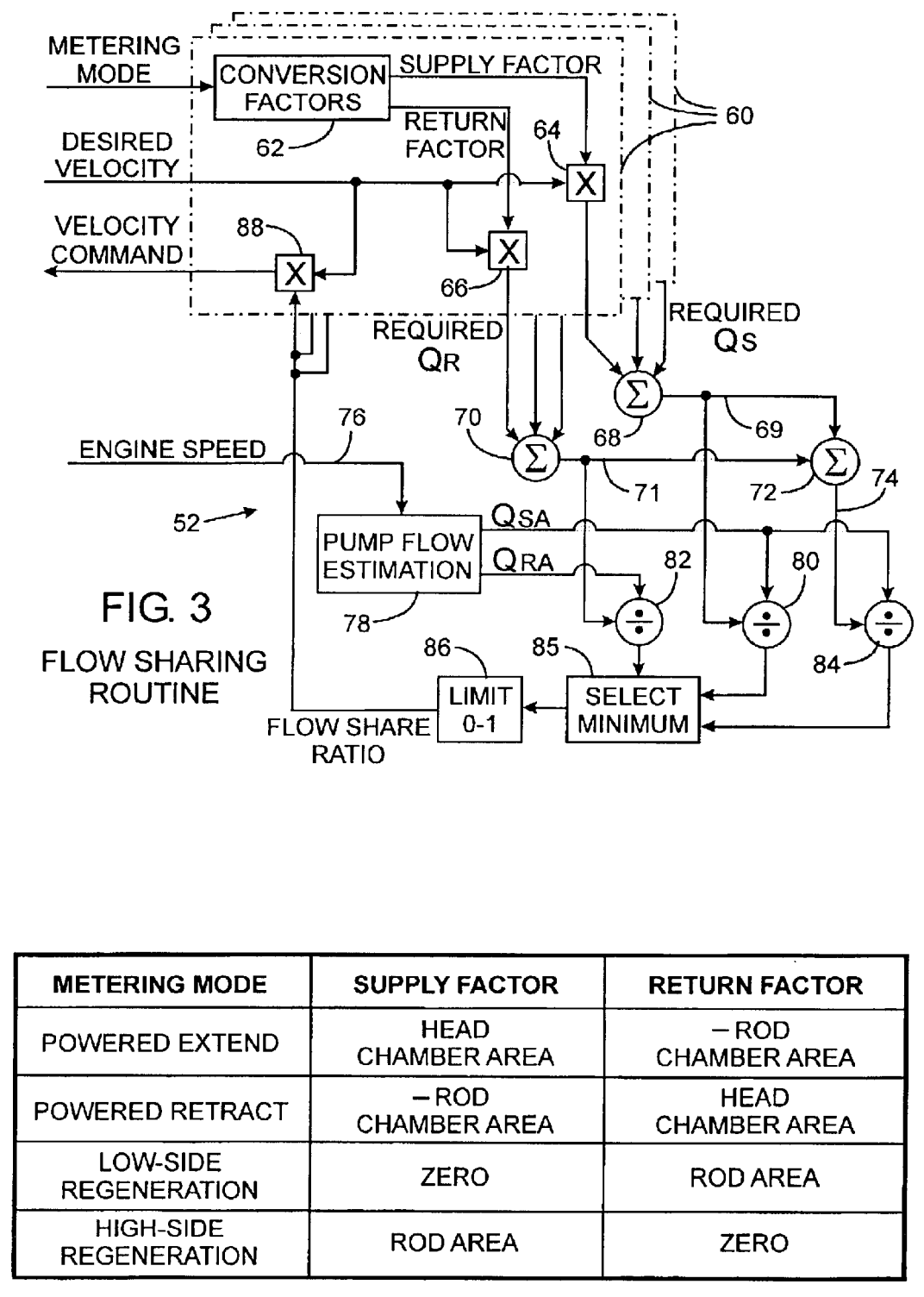

FIG. 3
FLOW SHARING ROUTINE

| METERING MODE | SUPPLY FACTOR | RETURN FACTOR |
|---|---|---|
| POWERED EXTEND | HEAD CHAMBER AREA | −ROD CHAMBER AREA |
| POWERED RETRACT | −ROD CHAMBER AREA | HEAD CHAMBER AREA |
| LOW-SIDE REGENERATION | ZERO | ROD AREA |
| HIGH-SIDE REGENERATION | ROD AREA | ZERO |

FIG. 4

METHOD OF SHARING FLOW OF FLUID AMONG MULTIPLE HYDRAULIC FUNCTIONS IN A VELOCITY BASED CONTROL SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to electrohydraulic systems for operating machinery, and in particular to control algorithms for such systems.

2. Description of the Related Art

A wide variety of machines have moveable members which are operated by an hydraulic actuator, such as a cylinder and piston arrangement, that is controlled by a hydraulic valve. Traditionally the hydraulic valve was manually operated by the machine operator. There is a present trend away from manually operated hydraulic valves toward electrical controls and the use of solenoid operated valves. This type of control simplifies the hydraulic plumbing as the control valves do not have to be located near an operator station, but can be located adjacent the actuator being controlled. This change in technology also facilitates sophisticated computerized control of the machine functions.

Application of pressurized hydraulic fluid from a pump to the actuator can be controlled by a proportional solenoid operated spool valve that is well known for controlling the flow of hydraulic fluid. Such a valve employs an electromagnetic coil which moves an armature connected to the spool that controls the flow of fluid through the valve. The amount that the valve opens is directly related to the magnitude of electric current applied to the electromagnetic coil, thereby enabling proportional control of the hydraulic fluid flow. Either the armature or the spool is spring loaded to close the valve when electric current is removed from the solenoid coil. Alternatively a second electromagnetic coil and armature is provided to move the spool in the opposite direction.

When an operator desires to move a member on the machine a joystick is operated to produce an electrical signal indicative of the direction and desired rate at which the corresponding hydraulic actuator is to move. The faster the actuator is desired to move the farther the joystick is moved from its neutral position. A control circuit receives a joystick signal and responds by producing a signal to open the associated valve. A solenoid moves the spool valve to supply pressurized fluid through an inlet orifice to the cylinder chamber on one side of the piston and to allow fluid being forced from the opposite cylinder chamber to drain through an outlet orifice to a reservoir, or tank. A hydromechanical pressure compensator maintains a nominal pressure (margin) across the inlet orifice portion of the spool valve. By varying the degree to which the inlet orifice is opened (i.e. by changing its valve coefficient), the rate of flow into the cylinder chamber can be varied, thereby moving the piston at proportionally different speeds. The electrical signal for the solenoid defines how much the inlet orifice is to open and thus the flow rate of hydraulic fluid through the valve to the actuator. Previous control circuits converted the joystick signal into a desired flow rate signal. This flow rate signal was then used to define the amount of electric current to apply to the valve's solenoid to achieve a desired inlet orifice valve coefficient. Thus prior control algorithms were based primarily on inlet orifice metering using an external hydromechanical pressure compensator.

Recently a set of proportional solenoid operated pilot valves has been developed to control fluid flow to and from the hydraulic actuator, as described in U.S. Pat. No. 5,878, 647. In these valves, the solenoid armature acts on a pilot poppet that controls the flow of fluid through a pilot passage in a main valve poppet. The armature is spring loaded to close the valve when electric current is removed from the solenoid coil.

The control of an entire machine, such as agricultural tractor or construction apparatus is complicated by the need to control multiple functions simultaneously. For example, control of a backhoe often requires that hydraulic actuators for the boom, arm and bucket must be simultaneously operated. In some cases, the aggregate amount of hydraulic fluid flow being demanded by the simultaneously operating functions exceeds the maximum flow that the pump is capable of producing. At such times, it is desirable that the control system allocate the available hydraulic fluid among those functions in an equitable manner, so that one function does not consume a disproportionate amount of the available hydraulic fluid flow.

SUMMARY OF THE INVENTION

A typical hydraulic system has a supply line that carries fluid from a source, a return line which carries fluid back to a tank, and a plurality of hydraulic actuators coupled to the supply line and the return line by a plurality of valve assemblies. The present method relates to controlling the valve assemblies to apportion the flow of fluid from a source equitably among the hydraulic actuators and maintain the velocity relationship among the actuators as desired by the operator.

The method involves requesting a desired velocity for a given one of the plurality of hydraulic actuators and then determining a required fluid flow based the metering mode and the desired velocity for the given hydraulic actuator. The aforementioned steps are performed for other ones of the plurality of hydraulic actuators, thereby producing a plurality of required fluid flows. The plurality of required fluid flows are summed to produce an aggregate required fluid flow for the hydraulic system.

An amount of fluid flow that is available from the source is determined. A proportion value is derived which represents a relationship between the aggregate required fluid flow and the amount of fluid flow available from the source. In the preferred embodiment, the proportion value represents how much of the required fluid flow can be provided by the amount of fluid flow available from the source. For example, the proportion is the percentage of the aggregate required fluid flow that can be satisfied by the flow available from all flow sources in the hydraulic system. Then a velocity command is calculated for each of the plurality of hydraulic actuators, wherein each velocity command is derived based on a respective desired velocity and the proportion value. The flow of fluid to each of the plurality of hydraulic actuators then is controlled in response to plurality of velocity commands.

BRIEF DESCRIPTION OF THE DRAWINGS

FIG. 3 depicts the details of the flow sharing routine of the control diagram; and FIG. 4 is a table that provides supply and return factors that are used in the control diagram for different metering modes.

DETAILED DESCRIPTION OF THE INVENTION

Figure 1:
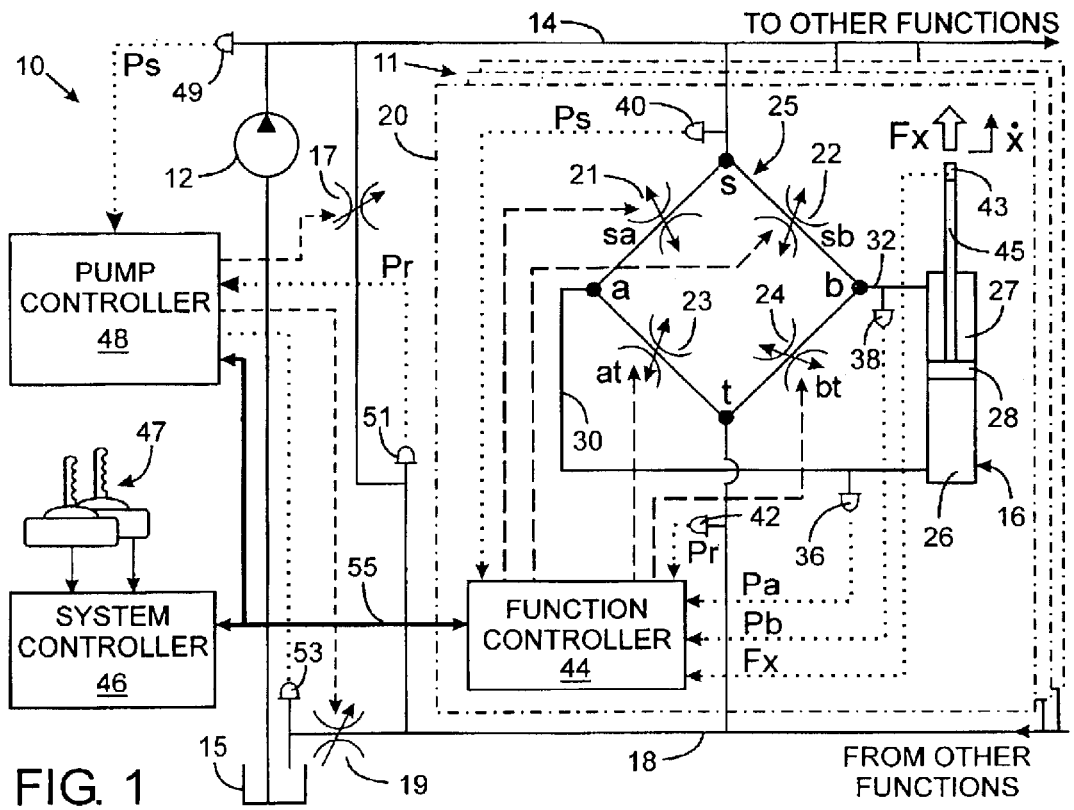
FIG. 1 is a schematic diagram of an exemplary hydraulic system incorporating the present invention.

With initial reference to FIG. 1, a hydraulic system 10 of a machine that has mechanical elements operated by hydraulically driven actuators, such as cylinder 16 or rotational motors. The hydraulic system 10 includes a positive displacement pump 12 that is driven by a motor or engine (not shown) to draw hydraulic fluid from a tank 15 and furnish the hydraulic fluid under pressure to a supply line 14. It should be understood that the novel techniques for apportioning fluid flow described herein also can be implemented on a hydraulic system that employs a variable displacement pump and other types of hydraulic actuators. The supply line 14 is connected to a tank return line 18 by an unloader valve 17 (such as a proportional pressure relief valve) and the tank return line 18 is connected by tank control valve 19 to the system tank 15.

The supply line 14 and the tank return line 18 are connected to a plurality of hydraulic functions on the machine on which the hydraulic system 10 is located. One of those functions 20 is illustrated in detail and other functions 11 have similar components. The hydraulic system 10 is of a distributed type in that the valves for each function and control circuitry for operating those valves can be located adjacent to the actuator for that function. For example, those components for controlling movement of the arm with respect to the boom of a backhoe are located at or near the arm cylinder or the junction between the boom and the arm.

In the given function 20, the supply line 14 is connected to node "s" of a valve assembly 25 which has a node "t" that is connected to the tank return line 18. The valve assembly 25 includes a node "a" that is connected by a first hydraulic conduit 30 to the head chamber 26 of the cylinder 16, and has another node "b" that is coupled by a second conduit 32 to a port of the rod chamber 27 of cylinder 16. Four electrohydraulic proportional valves 21, 22, 23, and 24 control the flow of hydraulic fluid between the nodes of the valve assembly 25 and thus control fluid flow to and from the cylinder 16. The first electrohydraulic proportional valve 21 is connected between nodes s and a, and is designated by the letters "sa". Thus the first electrohydraulic proportional valve 21 controls the flow of fluid between the supply line 14 and the head chamber 26 of the cylinder 16. The second electrohydraulic proportional valve 22, designated by the letters "sb", is connected between nodes "s" and "b" and can control fluid flow between the supply line 14 and the cylinder rod chamber 27. The third electrohydraulic proportional valve 23, designated by the letters "at", is connected between node "a" and node "t" and can control fluid flow between the head chamber 26 and the return line 18. The fourth electrohydraulic proportional valve 24, which is between nodes "b" and "t" and designated by the letters "bt", controls the flow from the rod chamber 27 to the return line 18.

The hydraulic components for the given function 20 also include two pressure sensors 36 and 38 which detect the pressures Pa and Pb within the head and rod chambers 26 and 27, respectively, of cylinder 16. Another pressure sensor 40 measures the pump supply pressure Ps at node "s", while pressure sensor 42 detects the tank return pressure Pr at node "t" of the function 20. It should be understood that the various pressures measured by these sensors may be slightly different from the actual pressures at these points in the hydraulic system due to line losses between the sensor and those points. However the sensed pressures relate to and are representative of the actual pressures and accommodation can be made in the control methodology for such differences.

The pressure sensors 36, 38, 40 and 42 for the function 20 provide input signals to a function controller 44 which operates the four electrohydraulic proportional valves 21–24. The function controller 44 is a microcomputer based circuit which receives other input signals from a system controller 46, as will be described. A software program executed by the function controller 44 responds to those input signals by producing output signals that selectively open the four electrohydraulic proportional valves 21–24 by specific amounts to properly operate the cylinder 16.

The system controller 46 supervises the overall operation of the hydraulic system exchanging signals with the function controllers 44 and a pressure controller 48. The signals are exchanged among the three controllers 44, 46 and 48 over a communication network 55 using a conventional message protocol. The pressure controller 48 receives signals from a supply line pressure sensor 49 at the outlet of the pump, a return line pressure sensor 51, and a tank pressure sensor 53. In response to those pressure signals and commands from the system controller 46 the pressure controller 48 operates the tank control valve 19 and the unloader valve 17. However, if a variable displacement pump is used, the pressure controller 48 controls the pump.

Figure 2:
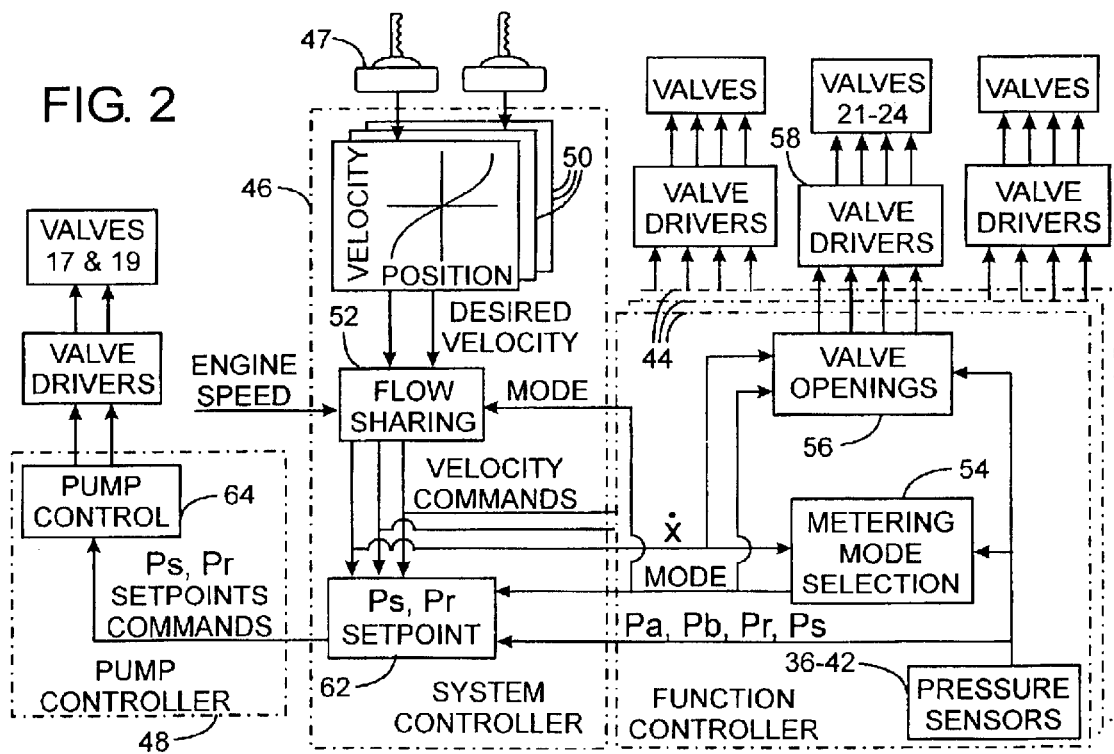
FIG. 2 is a control diagram for the hydraulic system.

With reference to FIG. 2, the control functions for the hydraulic system 10 are distributed among the different controllers 44, 46 and 48. A software program executed by the system controller 46 responds to input signals by producing commands for the function controllers 44. Specifically, the system controller 46. receives signals from several user operated joysticks 47 or similar input devices for the different hydraulic functions. Those input device signals are received by a separate mapping routine 50 for each function which converts the joystick position signal into a signal indicating a desired velocity for the associated hydraulic actuator being controlled. The mapping function can be linear or have other shapes as desired. For example, the first half of the travel range of the joystick from the neutral center position may map to the lower quartile of velocities, thus providing relatively fine control of the actuator at slow velocity. In that case, the latter half of the joystick travel maps to the upper 75 percent range of the velocities. The mapping routine may be implemented by an arithmetic expression that is solved by the computer within system controller 46, or the mapping may be accomplished by a look-up table stored in the controller's memory. The output of the mapping routine 50 is a signal indicative of the velocity desired by the system user for the respective function.

In an ideal situation, that desired velocity is used to control the hydraulic valves associated with the particular function. However in many instances, the desired velocity may not be achievable in view of the simultaneous demands placed on the hydraulic system by other functions 11 of the hydraulic system 10. For example, the total quantity of hydraulic fluid flow demanded by all the functions may exceed the available output of the pump 12. In that case, the control system apportions the available flow among the functions demanding hydraulic fluid, and a given function is unable to operate at the full desired velocity. Although that apportionment may not achieve the desired velocity of each function, it does maintain the velocity relationship among the actuators as indicated by the operator.

To determine whether apportionment is required, the desired velocities for all the functions are applied to a flow sharing software routine 52, which compares the amount of flow available to the aggregate flow being demanded by the presently active hydraulic functions. The result of that comparison is a percentage of the aggregate demanded flow that can be met by the total available flow. The desired velocity for each function then is multiplied by that percentage to produce a velocity command for the respective function. Thus when apportionment is necessary, the functions are operated at a fraction of their desired velocities so that the available fluid flow will be allocated in a equitable manner that preserves the velocity relationships among the active functions as intended by the operator.

In order for the flow sharing routine 52 to apportion the available fluid, the metering mode of each function must be known, because that mode determines the demanded amount of fluid and the function's contribution of fluid that can be used by other functions. The metering mode for a particular function is determined by a metering mode selection routine 54 executed by the function controller 44 of the associated hydraulic function.

With reference to FIG. 1, the fundamental metering modes in which fluid is supplied from the pump to one of the cylinder chambers 26 or 27 and drained to tank from the other chamber are referred to as powered metering modes, i.e. the powered extension mode or the powered retraction mode depending the direction that the piston rod moves. Because the piston rod 45 occupies some of the volume of the rod chamber 27, that chamber requires less hydraulic fluid to move the piston a given amount than is required by the head chamber. As a consequence, less supply fluid flow is required in the retraction mode than in the extension mode.

Hydraulic systems also employ regeneration metering modes in which fluid being drained from one cylinder chamber is fed back through the valve assembly 25 to the other cylinder chamber. In a regeneration metering mode, the fluid can flow between the cylinder chambers through either the supply line node "s" referred to as "high side regeneration", or through the return line node "t" in "low side regeneration". The benefit of a regeneration mode is that the entire volume of fluid required to fill the expanding chamber of the cylinder does not have to be supplied from the pump 12 or return line 18.

To retract the piston rod in a regeneration mode, fluid is forced from the head chamber 26 into the rod chamber 27 of a cylinder. Therefore, a greater volume of fluid is draining from the head chamber than is required in the smaller rod chamber. In the low side regeneration retraction mode, that excess fluid enters the return line 18 from which it continues to flow either to the tank 15 or to other functions 11 operating in a low side regeneration mode that requires additional fluid. That excess fluid, in the high side regeneration retraction mode, flows through the supply line 14 to other functions 11 that are drawing fluid from that line.

Regeneration also can be used to extend the piston rod 45 from the cylinder 16. In this case, an insufficient volume of fluid is exhausting from the smaller rod chamber 27 than is required to fill the head chamber 26. When high side regeneration is used to extend the rod, the additional fluid comes from the pump 12. In the low side regeneration extension mode, the function has to receive additional fluid from the tank return line 18. That additional fluid originates either from another function (i.e. cross-function regeneration), or from the pump 12 through the unloader valve 17. It should be understood that in this mode, the tank control valve 19 is at least partially closed to restrict fluid in the return line 18 from flowing to the tank 15, instead that fluid will be supplied to another function 11.

With reference to FIG. 3, the signals designating the metering mode and the desired velocity for each function are applied to the flow sharing routine 52 in order to determine whether a sufficient supply of fluid exists from the various sources to produce the desired velocities of all the functions. The flow sharing routine 52 has a separate processing section 60 to determine the flow from the supply and return lines that are required by each function. Each processing section 60 uses the metering mode for the associated function to select a flow conversion factor at block 62 that relates the desired velocity to the respective required flows. The table of FIG. 4 specifies the supply factor and the return factor for each of the metering modes The supply and return factors are the cross sectional area of the piston rod 45 (ROD AREA) and the cross sectional areas of the head and rod chambers 26 and 27 (HEAD CHAMBER AREA, ROD CHAMBER AREA). In a conventional cylinder and piston assembly, the ROD CHAMBER AREA plus the ROD AREA equals the HEAD CHAMBER AREA.

Referring again to FIG. 3, process block 62 produces flow conversion factors (supply factor and return factor) for the supply and return lines. Each flow conversion factor is multiplied by the desired velocity in multipliers 64 and 66 to produce values $Q_S$ and $Q_R$ respectively representing the required flow for the supply and return lines 14 and 18 in order achieve the desired velocity. The values for the required supply line flow $Q_S$ from the processing sections 60 are summed at node 68 which produces a value on line 69 representing the aggregate flow required from the supply line 14 by all the functions. Similarly, the required return line flows $Q_R$ from the processing sections 60 are summed at node 70 to produce a value on line 71 representing the aggregate flow required from the return line 18. The aggregate supply and return line flows in turn are summed at node 72 to generate a total demanded flow on line 74.

The flow sharing routine 52 also receives a signal on line 76 which indicates the speed of the engine that is powering the pump 12. A subroutine 78 estimates the flow available from the pump when driven at that engine speed. From that pump flow estimate the subroutine derives an available supply line flow $Q_{SA}$ and the available return line flow $Q_{RA}$ which flows through the unloader valve 17. These values indicate the flow available in the respective line.

The flow sharing routine 52 then uses the available supply line and the return line flow estimates $Q_{SA}$ and $Q_{RA}$ along with the aggregate flows demanded from those lines by the functions to determine whether the system can satisfy the demanded flows, i.e. whether the desired velocities of the actuators can be achieved. Specifically, the available supply line flow $Q_{SA}$ is divided at divider 80 by the aggregate demanded supply line flow to determine the amount of that demanded flow which can be satisfied at this time. The result of that division is applied to selection block 85. For example, if the desired flow is 100 lpm and the total available flow is 90 lpm, then the output from the associated divider is 0.9, denoting that 90% of the desired flow is available. At divider 82, the available return line flow $Q_{RA}$ is divided by the aggregate demanded return line flow to determine how much of that demanded flow can be satisfied and result is supplied to selection block 85. Divider 84 divides the available supply line flow $Q_{SA}$ by the total demanded flow on line 74, thereby producing a value indicating the amount of the total demand flow that can be satisfied which also is applied to the selection block 85. If any of the division operations performed by devices 80, 82, or 84 would involve a divisor that has a value equal to or less than zero that the device produces an output value of zero.

The selection block 85 chooses the output from the three dividers 80, 82 or 84 that has the smallest numerical value, indicating which one of the demanded flows will be satisfied the least by the available flow. This selected value is limited at process block 86 to a value between zero and one to produce a flow share ratio corresponding to the percentage (0% to 100%) of the demanded flow that can be satisfied and thus the percentage of the desired velocity that can be achieved.

The flow share ratio from process block 86 is applied to another multiplier 88 in each of the processing loops 60 at which that value is multiplied by the desired velocity for the associated function to produce a velocity command. It should be apparent that when the available flow is equal to or greater than the demanded flow (flow share ratio=1), the velocity command equals the desired velocity. In other situations, the velocity command will be a percentage of the desired velocity as the available flow is insufficient to achieve that desired velocity.

With reference again to FIG. 2, the velocity command for each function is sent to the associated function controller 44 where it is applied to the metering mode selection routine 54. The routine can be a manual input device which is operable by the machine operator to determine the mode for a given function. Alternatively, the function controller 44 can employ an algorithm in which various system pressures are examined to determine the optimum metering mode for the given function at that particular point and time. Once selected, the metering mode is communicated to the system controller 46 and other routines within the respective function controller 44.

The metering mode, the pressure measurements and the velocity command are used by a valve opening routine 56 to determine how to operate the electrohydraulic proportional valves 21–24 to achieve the commanded velocity of the piston rod 45. In each metering mode, two of the valves in assembly 25 are active, or open. The metering mode determines which pair of valves will be opened. The valve opening routine 56 then utilizes the magnitude of the velocity command and the pressure measurements to determine the amount that each of the selected valves is to be opened. This results in a set of four output signals which the function controller sends to a set of valve drives 58 which produce electric current levels for operating the selected ones of valves 21–24.

The system controller 46 also calculates the pressure in the supply and return lines 14 and 18 in order to meet the fluid supply requirements of the hydraulic functions 11 and 20. For that purpose, the system controller 46 executes a setpoint routine 62 which determines a separate pump supply pressure setpoint for each function of the machine and then selects the setpoint having the greatest magnitude to use as the supply line pressure setpoint Ps. The setpoint routine 62 also determines a return line pressure setpoint Pr in a similar manner. The two pressure setpoints, Ps and Pr, are then used by a pump control routine 64 executed by the pressure controller 48 to achieve those pressure levels in the supply line 14 and the return line 18.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method of apportioning flow of fluid from a source to a plurality of hydraulic actuators, wherein each hydraulic actuator is operated in a metering mode, that method comprising steps of:
   (a) requesting a desired velocity for one of the plurality of hydraulic actuators;
   (b) determining a required fluid flow based on the metering mode and the desired velocity for the one of the plurality of hydraulic actuators;
   (c) repeating steps (a), (b) for other ones of the plurality of hydraulic actuators thereby producing a plurality of required fluid flows;
   (d) summing the plurality of required fluid flows to derive an aggregate required fluid flow;
   (e) determining an amount of fluid flow available from the source;
   (f) deriving a proportion value representing a relationship between the aggregate required fluid flow and the amount of fluid flow available from the source;
   (g) deriving a velocity command based on the desired velocity for a given one of the plurality of hydraulic actuators and the proportion value; and
   (h) controlling flow of fluid to the given one of the plurality of hydraulic actuators in response to the velocity command.

2. The method as recited in claim 1 wherein determining a required fluid flow comprises:
   selecting a conversion factor for the metering mode; and
   arithmetically deriving the required fluid flow from the conversion factor and the desired velocity.

3. The method as recited in claim 2 wherein arithmetically deriving the required fluid flow comprises multiplying the conversion factor with the desired velocity.

4. The method as recited in claim 1 wherein the proportion value represents a proportion that the amount of fluid flow available from the source is to the aggregate required fluid flow.

5. The method as recited in claim 1 wherein deriving a proportion value comprises dividing a first value corresponding to the amount of fluid flow available from the source by a second value corresponding to the aggregate required fluid flow.

6. The method as recited in claim 1 further comprising limiting the velocity command from exceeding the desired velocity.

7. The method as recited in claim 1 further comprising repeating steps (g) and (h) for each of the other ones of the plurality of hydraulic actuators.

8. In a hydraulic system having a supply line carrying fluid from a pump, a return line carrying fluid to a tank, and a plurality of hydraulic circuits each having an actuator coupled to the supply line and the return line by a valve assembly, wherein each hydraulic circuit is operated in one of a plurality of metering modes, a method for controlling fluid flow comprising:

(a) requesting a desired velocity for a particular hydraulic actuator;

(b) in response to the metering mode and the desired velocity for the particular hydraulic actuator, determining a required supply fluid flow which represents a level of fluid flow between the particular hydraulic actuator and the supply line;

(c) in response to the metering mode and the desired velocity for the given hydraulic actuator, determining a required return fluid flow which represents level of fluid flow between the given hydraulic actuator and the return line;

(d) repeating steps (a), (b) and (c) for other ones of the plurality of hydraulic actuators thereby producing a plurality of required supply fluid flows and a plurality of required return fluid flows;

(e) summing the plurality of required supply fluid flows to produce an aggregate required supply fluid flow;

(f) summing the plurality of required return fluid flows to produce an aggregate required return fluid flow;

(g) determining an amount of fluid flow available from the supply line;

(h) deriving a first proportion value representing a first relationship between the aggregate required supply fluid flow and the amount of fluid flow available from the supply line;

(i) determining an amount of fluid flow available from the return line;

(j) deriving a second proportion value representing a second relationship between the aggregate required return fluid flow and the amount of fluid flow available from the return line;

(k) selecting one of the first proportion value and the second proportion value as a selected proportion value;

(l) deriving a velocity command from the desired velocity for a given hydraulic actuator and the selected proportion value;

(m) controlling flow of fluid to the given hydraulic actuator in response to the velocity command; and (n) repeating steps (l) and (m) for at least one other of the plurality of hydraulic actuators thereby producing a plurality of velocity commands.

9. The method as recited in claim 8 wherein determining a required supply fluid flow comprises:

selecting a conversion factor for the metering mode; and arithmetically deriving the required supply fluid flow from the conversion factor and the desired velocity.

10. The method as recited in claim 9 wherein arithmetically deriving the required supply fluid flow comprises multiplying the conversion factor with the desired velocity.

11. The method as recited in claim 8 wherein determining a required return fluid flow comprises:

selecting a conversion factor for the metering mode; and arithmetically deriving the required return fluid flow from the conversion factor and the desired velocity.

12. The method as recited in claim 11 wherein arithmetically deriving the required return fluid flow comprises multiplying the conversion factor with the desired velocity.

13. The method as recited in claim 8 wherein the first proportion value represents a proportion that the amount of fluid flow available from the supply line is to the aggregate required supply fluid flow.

14. The method as recited in claim 8 wherein the second proportion value represents a proportion that the amount of fluid flow available from the return line is to the aggregate required return fluid flow.

15. The method as recited in claim 8 wherein:

deriving the first proportion value comprises dividing a first value corresponding to the amount of fluid flow available from the supply line by a second value corresponding to the aggregate required supply fluid flow; and deriving the second proportion value comprises dividing a third value corresponding to the amount of fluid flow available from the return line by a fourth value corresponding to the aggregate required return fluid flow.

16. The method as recited in claim 8 wherein the step of selecting selects the lesser of the first proportion value and the second proportion value.

17. The method as recited in claim 8 further comprising limiting the velocity command from exceeding the desired velocity.

18. The method as recited in claim 8 further comprising:

summing the aggregate required supply fluid flow and the aggregate required return fluid flow to produce a total aggregate required fluid flow;

deriving a third proportion value representing a third relationship between the total aggregate required fluid flow and the amount of fluid flow available from the supply line; and wherein the selected proportion value is produced by selecting one of the first proportion value, the second proportion value and the third proportion value.

19. The method as recited in claim 18 wherein the third proportion value represents a proportion that the amount of fluid flow available from the supply line is to the total aggregate required fluid flow.

20. The method as recited in claim 18 wherein the step of selecting selects the lesser of the first proportion value, the second proportion value and the third proportion value.

* * * * *